United States Patent [19]

Larkin

[11] Patent Number: 4,466,630
[45] Date of Patent: Aug. 21, 1984

[54] BICYCLE SPARK WHEEL

[76] Inventor: Larry C. Larkin, 6938 E. Newton Pl., Tulsa, Okla. 74115

[21] Appl. No.: 417,143

[22] Filed: Sep. 13, 1982

[51] Int. Cl.³ .............................................. B62J 5/08
[52] U.S. Cl. ................................ 280/289 D; 248/900; 403/91; 403/148; 446/23
[58] Field of Search .......... 280/289 R, 289 A, 289 D, 280/289 E, 289 G, 289 H, 289 L, 816, 809; 403/91, 148; 248/475 B; 16/297, 328, 321, 35 R; 46/10, 48; 446/23; 116/56, 61, 158; 188/1.12

[56] References Cited

U.S. PATENT DOCUMENTS

| | | | |
|---|---|---|---|
| 1,760,622 | 5/1930 | Aronson | 46/48 |
| 2,167,249 | 7/1939 | McKeige | 46/10 |
| 3,646,703 | 3/1972 | Baginski et al. | 46/48 |
| 4,099,738 | 7/1978 | Allen | 280/289 D |

FOREIGN PATENT DOCUMENTS

| | | | |
|---|---|---|---|
| 467046 | 3/1914 | France | 446/23 |
| 1003414 | 11/1951 | France | 446/23 |
| 429537 | 6/1935 | United Kingdom . | |

Primary Examiner—Joseph F. Peters, Jr.
Assistant Examiner—Mitchell J. Hill
Attorney, Agent, or Firm—Head, Johnson & Stevenson

[57] ABSTRACT

A sparking accessory adapted to be mounted on a bicycle, or the like, and comprising a stationary friction disc member and a rotational sparking disc member. In one embodiment of the invention, the accessory is mounted on a pivotal arm member which in turn is secured to the bicycle, the arm member being manually movable between upper and lower positions, the upper position being the storage position for the accessory in a nonoperative position therefor, and the lower position placing the rotational sparking disc member in frictional engagement with the outer periphery of the bicycle tire for achieving a sparking effect. In another embodiment of the invention, the stationary friction disc member is secured to a housing structure and the rotational sparking disc member is secured to the drive shaft of a battery powered motor for selective rotation of the sparking disc member with respect to the friction disc member to achieve a sparking effect.

5 Claims, 8 Drawing Figures

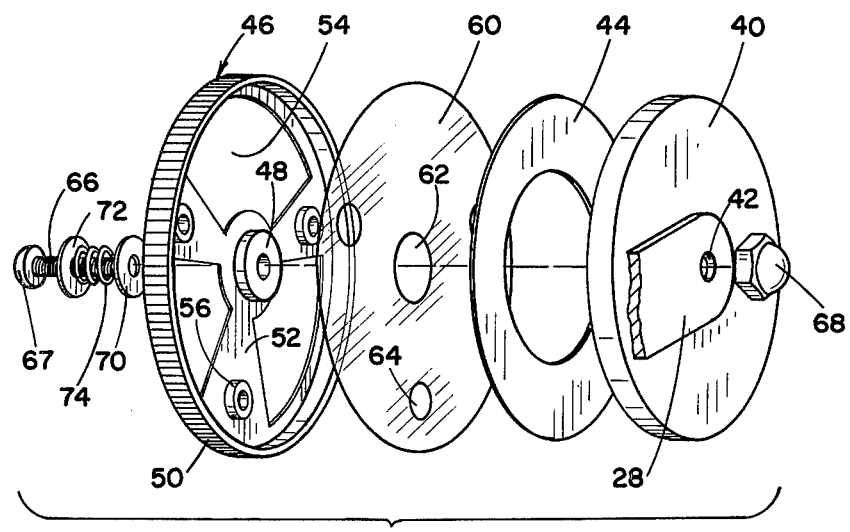
Fig. 4
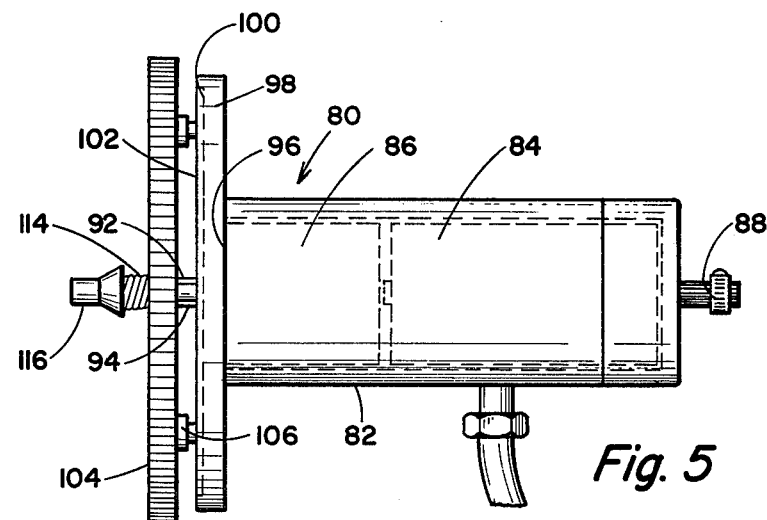
Fig. 5
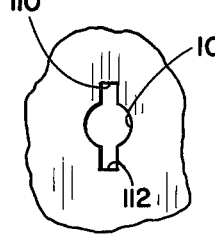
Fig. 6
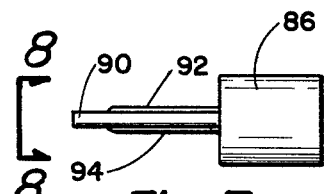
Fig. 8
Fig. 7

BICYCLE SPARK WHEEL

BACKGROUND OF THE INVENTION

1. Field of the Invention

This invention relates to improvements in amusement devices and more particularly, but not by way of limitation, to a spark wheel for installation on a bicycle, or the like for achieving an interesting side effect during utilization thereof.

2. Description of the Prior Art

Bicycles and other open-type wheeled vehicles are frequently ridden for enjoyment in addition to the utilitarian aspects of the vehicles. Young persons in particular apparently enjoy riding bicycles, and the like for the sheer joy of the experience. Young persons frequently attach auxiliary devices to the bicycle for enhancing the entertainment of riding thereof, as for example, flap means arranged for being engaged by the spokes of the wheels during rotation thereof are frequently secured to the bicycle to achieve a desired noise effect. Other such auxiliary devices have been used, such as that shown in the Madden U.S. Pat. No. 585,529, issued June 29, 1897, and entitled "Bicycle Alarm." The device comprises a friction disc means normally disposed out of engagement with the tire of the bicycle, and when moved into engagement with the outer periphery of the tire the frictional engagement therebetween actuates a pneumatic alarm and brake. The Bradley U.S. Pat. No. 1,224,843, issued May 1, 1917 and entitled "Mechanical Horn" discloses a bicycle attachment comprising a sound disc enclosed in a casing which is normally positioned out of engagement with the bicycle tire, and upon moving the casing into frictional engagement with the outer periphery of the tire, the sound disc is activated for actuation of a horn.

Examples of auxiliary equipment used with other types of open-type wheeled vehicles are shown in the Hooks U.S. Pat. No. 1,790,423 issued Jan. 27, 1931, and entitled "Roller Skate"; and the Bergstein U.S. Pat. No. 4,286,806, issued Sept. 1, 1981, and entitled "Roller Skating Spark Generator". The Hooks patent relates to a roller skate wheel having a frictional disc provided thereon, and a pyrophoric block means adapted to press against the face of the frictional disc to produce a sparking effect during use of roller skates. The Bergstein patent shows a frictional cylindrical means interposed between a pair of axially spaced wheels on the roller skate, and a spark producing button adapted to engage the outer periphery of the friction cylinder as the skate is used, thus producing a sparking effect. In addition, a hand held spark producing toy is shown in the Arnold U.S. Pat. No. 1,899,073, issued Feb. 28, 1933, and entitled "Siren Toy With Spark Producing Device"; and a toy motorcycle having a spark producing means thereon is shown in the British Pat. No. 429,537, issued to Carl Arnold on June 27, 1935, and entitled "Mechanical Toy."

SUMMARY OF THE INVENTION

The present invention contemplates a novel auxiliary device adapted to be mounted on a bicycle, or the like, for selectively producing a sparking effect at the selection of the rider of the vehicle. The novel device comprises a friction disc assembly having a rotatable housing supporting striker means, and at least one non-rotatable friction disc means engagable by the striker means for producing a sparking action. The friction disc assembly may be suitably mounted on a spring urged pivotal arm assembly whereby the normal non-operative position of the device is such that the rotatable housing is out of engagement with any actuating portion of the bicycle, such as one of the wheels. When the sparking effect is desired, the pivotal arm may be moved into a position whereby the rotatable housing is in frictional engagement with the outer periphery of the bicycle tire, and the spring means urging the pivotal arm in a direction toward the tire securely holds the rotatable housing in engagement therewith. As the wheel turns, the housing is rotated about its own central axis, carrying the striker means in a circular path about the face of the stationary friction disc means, creating a sparking effect in the well known manner of such devices. Of course, when the sparking effect is not desired, the pivotal arm may be moved against the force of the spring and in a direction away from the tire for restoring the housing to the normal non-operative position therefor. Of course, suitable latching means is provided for the pivotal arm means in order to secure the arm means in the position for maintaining the housing in the non-operative position therefor until the sparking effect is again desired. In another embodiment of the novel device, the rotatable housing may be operably secured to the drive shaft of a suitable battery powered motor for rotation thereby. The friction disc means may be secured to a housing encasing the motor and its power supply and remains stationary with respect to the rotatable housing and the striker means carried thereby. A switch, preferably of the dead-man type, is mounted on the housing and operably connected with the power supply for activation thereof when the sparking effect is desired. The novel sparking accessory is simple and efficient in operation and economical and durable in construction.

BRIEF DESCRIPTION OF THE DRAWINGS

FIG. 4 is an enlarged exploded perspective view of a friction disc assembly embodying the invention.

FIG. 5 is a side elevational view of a modified sparking accessory embodying the invention.

FIG. 6 is a front elevational view of a portion of the rotating element of the friction disc assembly of the sparking accessory shown in FIG. 5.

FIG. 7 is a side elevational view of the motor of the sparking accessory shown in FIG. 5.

FIG. 8 is a view taken on line 8—8 of FIG. 7.

DETAILED DESCRIPTION OF THE PREFERRED EMBODIMENT

Figure 1:
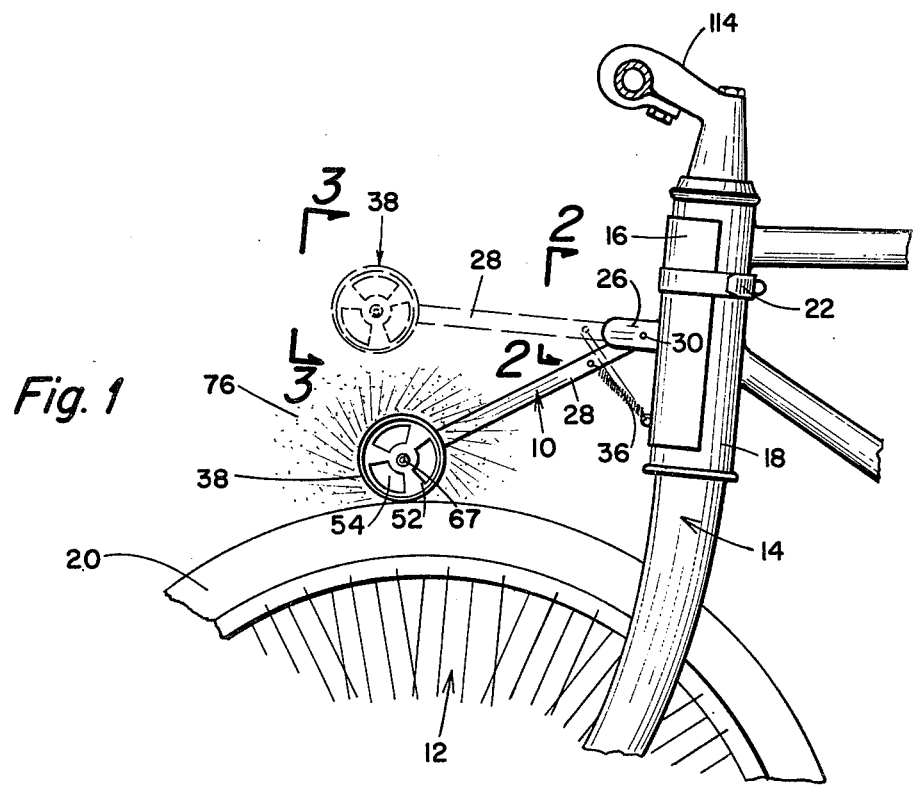
FIG. 1 is a side elevational view of a portion of a bicycle having a sparking accessory embodying the invention installed thereon, with one position of the accessory being shown in solid lines and another position thereof shown in broken lines for purposes of illustration.
Figure 2:
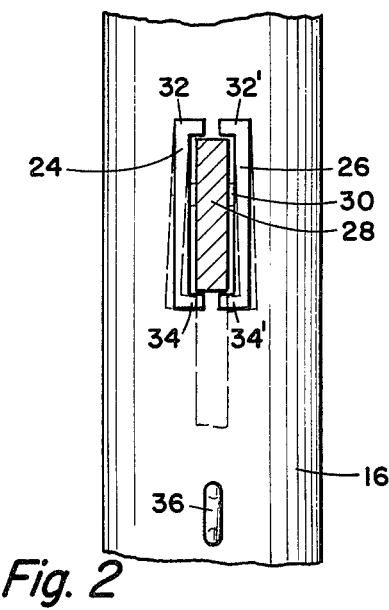
FIG. 2 is a view taken on line 2—2 of FIG. 1.
Figure 3:
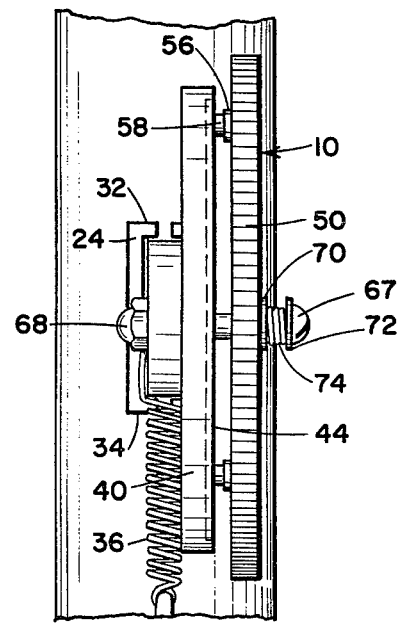
FIG. 3 is a view taken on line 3—3 of FIG. 1.

Referring to the drawings in detail, and particularly FIGS. 1 through 4, reference character 10 generally indicates a sparking accessory adapted to be installed on a bicycle 12, or the like, and preferably in the proximity of the yoke assembly 14 of the bicycle, but not limited thereto. The accessory 10 comprises a mounting plate 16 preferably of a configuration complementary to or corresponding with the configuration of the outer periphery of the portion 18 of the yoke assembly 14 which is normally disposed in substantial alignment with the central plane of the front tire 20 of the bicycle 12 and spaced thereabove. The plate 16 may be secured in position in any suitable manner, such as by a hose clamp means 22, or the like, and is provided with a pair of radially outwardly extending yieldable bracket members 24 and 26 secured thereto in any suitable manner (not shown). The bracket members 24 and 26 are substantially identical, but oppositely disposed, and are spaced apart for receiving one end of an arm member 28 therebetween.

The arm 28 is pivotally secured to the brackets 24 and 26 in any suitable manner, such as by a pivot pin 30. Each of the bracket members 24 and 26 are of a channel-like cross sectional configuration, each having upper and lower inwardly extending legs 32 and 34 and 32' and 34', respectively, as clearly shown in FIG. 2. When the pivotal arm 28 is disposed in a raised position thereof, as shown in broken lines in FIGS. 1 and 2, the arm is disposed between the inwardly directed legs 32-32' and 34-34', and is securely retained in the upper position by the engagement with the lower legs 34 and 34', as shown in solid lines in FIG. 2. When the arm 28 is to be pivoted downwardly or in a direction toward the tire 20, the yieldable characteristics of the brackets 24 and 26 permits a mutually outward movement of the lower legs 34 and 34' for permitting the arm 28 to pass therebetween, as shown in broken lines in FIG. 2. A suitable helical spring means 36 is anchored between the plate 16 and the arm 28 in any well known manner for constantly urging the arm 28 in a direction toward the tire 20, and thus retains the arm 28 in the lowered position thereof during activation of the sparking accessory 10 as will be hereinafter set forth.

A friction disc assembly generally indicated at 38 is secured to the outer end of the arm 28 and comprises a first disc member 40 (FIG. 4) rigidly secured against rotation and to the arm 28 in any suitable manner (not shown). A central bore 42 extends through the disc 40 and arm member 28, and an annular friction disc means 44 is glued or otherwise secured to the outer face of the disc 40. A rotatable housing or casing 46 is disposed outboard of the discs 40 and 44 and is spaced therefrom by a centrally disposed apertured hub member 48 which may be either integral with the casing 46, secured thereto, or independent thereof, as desired.

The casing 46 comprises a substantially cylindrical sleeve 50 preferably having the outer periphery thereof serrated or otherwise roughened for providing a friction surface for a purpose as will be hereinafter set forth. One end of the sleeve 50 is open and the opposite end thereof is provided with an end plate 52 having at least one and preferably a plurality of openings 54 provided therein. At least one aperture boss member 56 is provided on the inner face of the end plate 52 for receiving a striker means 58 therein. The striker means 58 may be constructed from any suitable material, such as flint, and is adapted to engage the outer face of the friction disc 44 during operation of the accessory 10, as will be hereinafter set forth. As shown herein, three of the striker means are disposed on a common circumference of the end plate 52 and are equally angularly spaced therearound for a proper balance of the rotating casing 50 during actuation of the device 10. It is preferable to provide a transparent cover disc 60 (FIG. 4) for the inner surface of the end plate 52. The disc 60 may be provided with a central aperture 62 for receiving the hub means 48 therethrough and a plurality of apertures 64 spaced radially outwardly therefrom for receiving the aperture boss members 56 therethrough for facilitating positioning of the disc 60 against the inner surface of the end plate 52. Of course, the disc 60 may be glued or otherwise secured to the end plate 52, if desired, but is not limited thereto.

A threaded shaft or rod 66 having a head member 67 on the outer end thereof extends through the aperture hub means 48 and through the aperture 42 of the disc 40 and arm 28 whereby the disc 40 and casing 46 are supported by a common central support shaft. A suitable cap screw means 68 is threadedly engaged with the inner end of the rod 66 adjacent the arm 28 (FIG. 4) for securing the rod in position. A pair of washers 70 and 72 are disposed around the outer periphery of the rod 66 outboard of the casing 46 and a helical spring 74 surrounding the rod 66 is interposed therebetween for constantly urging the casing 46 in a direction toward the disc 40 for assuring an efficient engagement of the striker means 58 with the friction disc member 44.

When it is desired to produce a sparking effect while riding the bicycle 12, as indicated at 76, the arm 28 may be manually moved to the lowered position therefor as shown in solid lines in FIG. 1. This moves the outer periphery of the sleeve 50 into engagement with the outer periphery of the tire 20, and as the tire rotates, the sleeve 50 is rotated about its own central axis. As the sleeve 50 rotates, the striker members 58 move circularly around the outer face of the friction disc 44, creating a sparking action, as is well known. As the striker members 58 become worn during use thereof, the spring 74 urges the sleeve 50 and striker members in a direction toward the disc 40, thus assuring a constant engagement between the strikers and the friction disc, until such time that the striker members are completely consumed, whereupon they may be replaced. In addition, the spring means 36 constantly urges the sleeve 50 against the outer periphery of the tire 20, thus assuring a substantially constant rotation of the sleeve 50 as the tire 20 rotates. When the sparking effect is no longer desired, the arm 28 may be manually moved to the upper storage position thereof, as shown in broken lines in FIG. 1. The engagement between the arm 28 and the lower legs 34-34' of the brackets 24 and 26 securely retains the arm 28 in the upper non-active or storage position therefor.

Referring now to FIGS. 5 through 8, a modified sparking accessory is generally indicated by reference numeral 80. The accessory 80 comprises a suitable housing 82, preferably of substantially cylindrical configuration, but not limited thereto, having suitable power supply means 84 and motor 86 disposed therein. The power supply means may be a battery, such as a flashlight battery or the like, and a manually operable switch means 88 mounted on the exterior of the housing 82 is operably connected with the battery in any well known manner (not shown) for selective activation of the motor 86. It is preferable that the switch means 88 be that of the type known as a dead man switch which requires constant manual depression or engagement thereof for activation of the motor for safety purposes.

The motor 86 is provided with a drive shaft 90 having a pair of oppositely disposed longitudinally extending key members 92 and 94 and which extends axially outwardly from one end 96 of the housing 82. A disc member 98 is rigidly secured to the end 96 of the housing 82 and is provided with a central bore (not shown) freely receiving the drive shaft 90 therethrough. The outer face of the disc 98 may be provided with a central recess portion 100, if desired, and an annular friction disc member 102 is secured in the recess 100 in any suitable manner, such as by glueing, or the like.

A casing 104 generally similar to the casing 46 is disposed outboard of the disc 98, as particularly shown in FIG. 5, and carries striker means 106 substantially identical to the striker means 56–58 for engagement with the friction disc 102. In addition, the casing 104 is provided with a central bore 108 (FIG. 6) for receiving the drive shaft 90 therethrough. The bore 108 is provided with oppositely extending keyways 110 and 112 for receiving the keys 92 and 94, respectively, therethrough whereby rotation of the drive shaft 90 is transmitted to the casing 104. A helical spring means 114 is disposed around the outer periphery of the drive shaft 90 outboard of the casing 104, and a suitable end cap 116 is suitably secured to the outer end of the shaft 90 for securing the spring 114 in position. The spring 114 constantly urges the casing 104 in a direction toward the disc 98 whereby an efficient and constant engagement of the striker means 106 with the friction disc 102 is assured.

When a sparking effect is desired, the switch 88 may be manually actuated for activation of the motor 86 in the usual manner to rotate the drive shaft 90. The rotation of the drive shaft 90 is transmitted to the casing 104 through the keys 92–94 and complementary keyways 110–112. As the casing 104 rotates, the striker means 106 moves circularly around the outer face of the friction disc 102, creating the sparking effect in the well known manner. As hereinbefore set forth, it is preferable that the switch 88 be of the dead-man type which requires constant manual engagement for operation of the motor and rotation of the casing 104. Thus, in the event the accessory 80 is mounted on the handle bars 114, or the like, of the bicycle 12, and in the further event that the rider falls from the bicycle, the sparking actuation of the accessory 80 will be ceased and there will be no danger of the sparking action causing a fire.

From the foregoing, it will be apparent that the present invention provides a novel sparking accessory for use with a bicycle to create an entertaining effect for the rider. The novel sparking accessory may be either manually moved into a physical frictional engagement with the outer periphery of a tire of the bicycle to achieve the sparking effect, or may be a battery powered device for manual activation when the sparking effect is desired.

Whereas the present invention has been described in particular relation to the drawings attached hereto, it should be understood that other and further modifications, apart from those shown or suggested herein may be made within the spirit and scope of this invention.

What is claimed is:

1. A sparking accessory for a wheeled vehicle and comprising stationary friction disc means, rotatable sparking disc means disposed in spaced relation with respect to the friction disc means for creating a sparking effect upon rotation of the sparking disc means, wherein the friction disc means and rotatable sparking disc means are mounted at one end of a pivotal arm means, the opposite end of said pivotal arm means being pivotally secured to the wheeled vehicle and movable between a storage and an operational position therefor, the sparking accessory being inoperative in the storage position of the pivotal arm means and actuated to achieve said sparking effect in the operational position of said pivotal arm means, and including plate means adapted to be secured to the wheeled vehicle, and bracket means extending outwardly from said plate means for pivotally securing the arm means to the vehicle.

2. A sparking accessory as set forth in claim 1 wherein the bracket means comprises a pair of oppositely disposed spaced bracket members, said bracket members being yieldable for releasing the arm means therefrom for providing for said pivotal movement thereof toward said operational position, and said bracket members engaging said arm means for retaining thereof in the storage position.

3. A sparking accessory as set forth in claim 1 and including housing means, power means disposed within said housing means, said stationary friction disc means being secured to the housing means, said rotatable sparking disc means being operably secured to the power means for selective rotation thereby to create said sparking effect.

4. A sparking accessory as set forth in claim 1 wherein the rotational sparking disc means comprises a substantially cylindrical sleeve member having one end thereof open, end plate means being provided at the opposite end of the sleeve member and provided with at least one opening therein, sparking means carried by the end plate means for engagement with the frictional disc means, and spring means constantly urging the sleeve member in a direction toward the friction disc means to assure a constant efficient engagement of the sparking means therewith.

5. A sparking accessory as set forth in claim 4 wherein the sparking means includes at least one flint member.

* * * * *